United States Patent
Burrows

(10) Patent No.: US 9,493,931 B2
(45) Date of Patent: Nov. 15, 2016

(54) MAINS WATER SUPPLY PROCESSING

(75) Inventor: Andrew Burrows, Soberton (GB)

(73) Assignee: i20 Water Limited, Southampton (GB)

( * ) Notice: Subject to any disclaimer, the term of this patent is extended or adjusted under 35 U.S.C. 154(b) by 498 days.

(21) Appl. No.: 13/173,578

(22) Filed: Jun. 30, 2011

(65) Prior Publication Data

US 2011/0290331 A1   Dec. 1, 2011

Related U.S. Application Data

(63) Continuation-in-part of application No. PCT/GB2009/002963, filed on Dec. 29, 2009.

(51) Int. Cl.
*E03B 7/02* (2006.01)
*E03B 7/07* (2006.01)
(Continued)

(52) U.S. Cl.
CPC .............. *E03B 7/02* (2013.01); *E03B 7/075* (2013.01); *G05D 16/2066* (2013.01);
(Continued)

(58) Field of Classification Search
CPC ............... E05B 7/02; E05B 7/04; E05B 7/07; E05B 7/072; E05B 1/00; E05B 1/02; E05B 1/04; E05B 2001/00; E05B 2001/04; G05D 16/2066; G05D 16/2073; G05D 21/02; G05D 7/00; G05D 7/06; G05D 7/0617; G05D
(Continued)

(56) References Cited

U.S. PATENT DOCUMENTS 4,200,911 A * 4/1980 Matsumoto .................. 700/28
5,427,350 A   6/1995 Rinkewich
(Continued)

FOREIGN PATENT DOCUMENTS

EP   0574241   12/1993
FR   GB2405957   3/2005
(Continued)

OTHER PUBLICATIONS

M. Fantozzi et al, "Experience and results achieved in introducing District Metering Areas (DMA) and Pressure Management Areas (PMA) at Enia utility (Italy)", downloaded from www.miya-water.com, 2009.*
(Continued)

*Primary Examiner* — Joseph Drodge
(74) *Attorney, Agent, or Firm* — McDonnell Boehnen Hulbert & Berghoff LLP.

(57) ABSTRACT

Water is supplied from a mains water supply station to a main supply conduit which feeds a plurality of regional supply networks, via respective pressure reducing valves, at respective regional pressures. Each regional supply network has a boundary value for a parameter related to a property of the water, which may be water pressure or concentration of a water treatment agent. Each network has a critical point at which the value of the parameter is deemed least acceptable. Water supply characteristics in respect of each regional supply network are monitored and the water supplied into the main supply conduit is processed to ensure acceptable values of the parameter are maintained at each critical point.

7 Claims, 1 Drawing Sheet

(51) Int. Cl.
*F04B 49/00* (2006.01)
*F04D 15/00* (2006.01)
*G05D 16/00* (2006.01)
*G05D 7/00* (2006.01)
*G05D 16/20* (2006.01)
*G05D 21/02* (2006.01)

(52) U.S. Cl.
CPC .......... *G05D 21/02* (2013.01); *Y10T 137/0318* (2015.04); *Y10T 137/8158* (2015.04); *Y10T 137/8593* (2015.04)

(58) Field of Classification Search
CPC .............. 7/0623;G05D 7/0676; G05D 7/0682; F17D 1/00; F17D 1/08; F04B 41/00; F04B 41/02; F04B 41/06; F04B 49/00; F04B 49/06; F04B 49/065; F04B 49/10; F04B 49/22; F04B 2201/06; F04B 2201/0601; F04B 2205/01; F04B 2205/05; F04B 2205/07; F04B 2205/09; F04B 2207/02; F04B 2207/04; F04B 2207/041; F04B 2207/0412; F04B 2207/042; F04B 2207/0422; E03B 1/02; E03B 7/07; E03B 7/072; E03B 7/075; F04D 15/00; F04D 15/0005; F04D 15/0022; F04D 15/0077; F04D 27/00; F04D 27/001; F04D 27/007; F04D 27/02; F04D 27/0253; F04D 27/0261; F04D 27/0284; Y10T 137/0318; Y10T 137/0396; Y10T 137/8158
USPC .............. 137/1, 12, 14, 488, 565.11, 565.13, 137/565.29, 565.3, 565.33; 210/85, 96.1, 210/97, 134, 143, 739, 741; 700/28, 282, 700/301; 702/45, 47, 50, 138, 188; 417/2–6, 26, 43, 44.2, 44.3, 53, 63
See application file for complete search history.

(56) References Cited

U.S. PATENT DOCUMENTS

| | | | |
|---|---|---|---|
| 5,460,196 A * | 10/1995 | Yonnet | 137/12 |
| 6,017,193 A | 1/2000 | Takeuchi | |
| 6,245,224 B1 | 6/2001 | Enoki | |
| 6,371,156 B1 | 4/2002 | Walton et al. | |
| 6,688,320 B2 * | 2/2004 | Frasure | F04D 15/0066 137/12 |
| 6,776,180 B1 * | 8/2004 | Yonnet | G05D 16/2093 137/14 |
| 6,829,566 B2 * | 12/2004 | Sage | 702/183 |
| 7,201,180 B2 * | 4/2007 | Ephrat et al. | 137/14 |
| 7,920,983 B1 * | 4/2011 | Peleg et al. | 702/100 |
| 8,276,612 B2 * | 10/2012 | Folk | F16K 31/365 137/489 |
| 2004/0020862 A1 | 2/2004 | Baca | |
| 2005/0016593 A1 | 1/2005 | Ephrat et al. | |
| 2005/0199483 A1 | 9/2005 | Kroll | |
| 2006/0020427 A1 * | 1/2006 | Kahn et al. | 702/188 |
| 2007/0021936 A1 * | 1/2007 | Marovitz | 702/100 |
| 2007/0090059 A1 | 4/2007 | Plummer | |
| 2008/0251146 A1 * | 10/2008 | Folk | F16K 31/365 137/624.27 |
| 2010/0141459 A1 | 6/2010 | Pham et al. | |
| 2010/0156632 A1 * | 6/2010 | Hyland et al. | 340/540 |

FOREIGN PATENT DOCUMENTS

| | | |
|---|---|---|
| FR | 2915755 | 11/2008 |
| GB | 2123983 | 2/1984 |
| JP | 6303677 | 10/1994 |
| JP | 2001280597 | 10/2001 |
| WO | 99/23544 | 5/1999 |
| WO | WO03/057998 | 7/2003 |
| WO | WO2005/022145 | 3/2005 |
| WO | WO2008/090359 | 7/2008 |
| WO | WO2008/114036 | 9/2008 |

OTHER PUBLICATIONS

Sekhonyana et al, Maximizing the benefits from water and environmental sanitation, Improving Utility Management: Case Study from Lesotho, 31$^{st}$ WEDC International Conference, Kampala, Uganda, 2005.*

PCT International Search Report, PCT International Application No. PCT/GB2009/002963 dated Jul. 26, 2010.

* cited by examiner

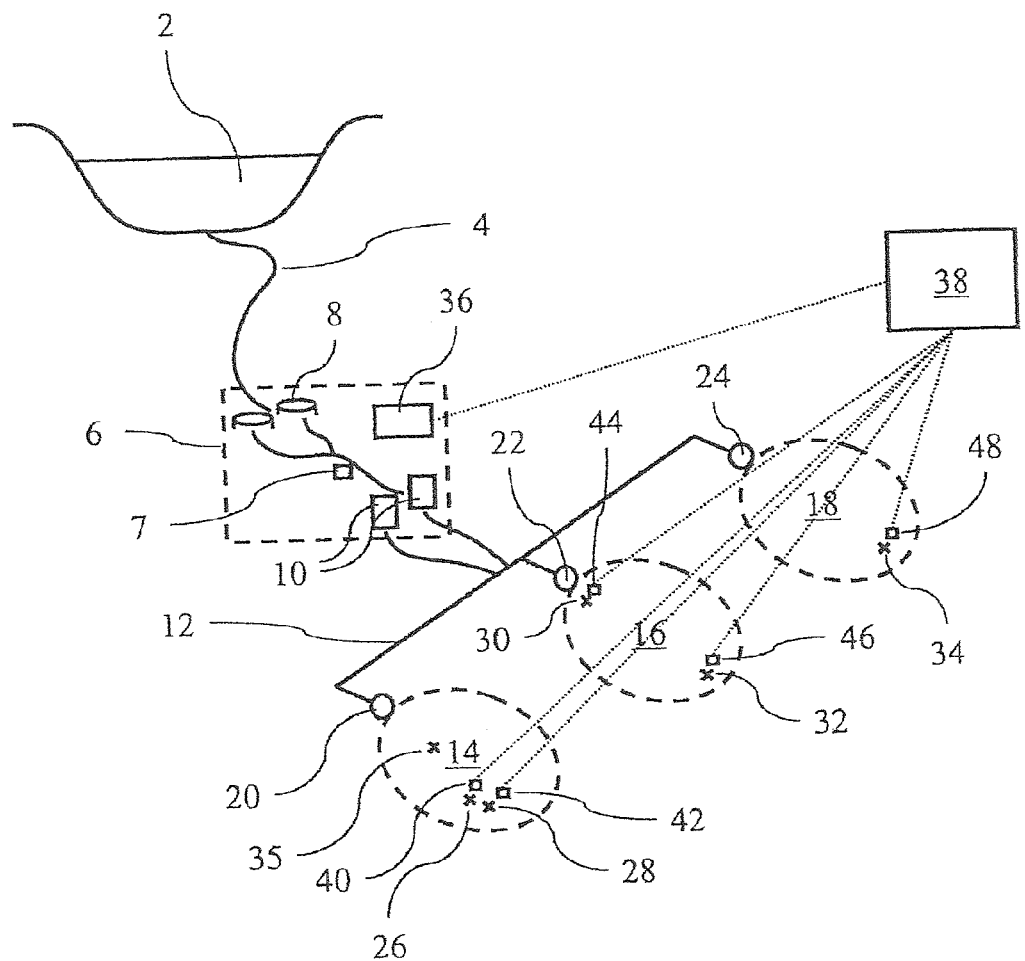

MAINS WATER SUPPLY PROCESSING

CROSS REFERENCE TO RELATED APPLICATIONS

The present application is a Continuation-In-Part based on PCT/GB2009/002963, filed Dec. 29, 2009, the entire contents of which is incorporated herein by reference. The present application claims priority both to PCT/GB2009/002963, filed Dec. 29, 2009, and to Great Britain Patent Application 0823656.4, filed Dec. 30, 2008, the entire contents of which is also incorporated herein by reference."

This invention relates to the supply of mains water and particularly to the control of parameters of the water supply at critical points in a distribution system.

The pressure in a mains water distribution system is created by pumps and/or the gravity head of water in a reservoir, water tower or the like. The pressure in the main arterial supply conduits is significantly higher than that required by consumers, whether domestic, agricultural or industrial. In a typical distribution system, a number of consumers are arranged in a region to which water is supplied from the main arterial supply network by a pressure reducing valve (PRV). Typically, this region is referred to as a district metering area (DMA). However, the concept of a district metering area is broader than this, since a DMA need not necessarily be joined to a main supply conduit by a PRV. It may simply be connected a main conduit by a meter. In some situations, rather than reducing the pressure in a regional network or DMA to below that in a main arterial conduit, it may be necessary to increase the pressure. In such situations a booster pump may supply water from the main conduit at a higher pressure into the consumer region or DMA.

Historically, the output pressure of the PRV for a particular region was fixed. Although there are several variations in design of PRV, a globe diaphragm actuated valve is the industry standard in the United Kingdom. Some PRVs are set up to create a fixed reduction in pressure. Others are fitted with pilot valves, which alter the position of the valve such that it automatically gives a fixed outlet pressure regardless of inlet pressure or flow rate. The fixed output pressure must be sufficiently high to ensure adequate pressure throughout the DMA, and in particular at the position which is subjected to the greatest head loss under maximum anticipated flow rates, which may be the highest and/or furthest point from the PRV in the DMA. Generally, the point where the pressure is lowest for a given output pressure from the PRV is known as the critical point and will normally be the highest and/or furthest point away from the PRV. However, it should be appreciated that within a particular DMA there may be more than one critical point, and that the critical point may vary.

A problem with such an arrangement is that at certain times or under certain conditions within the DMA, the fixed pressure may be higher than that necessary to ensure an adequate pressure at the or each Critical Point. It is known that there is a relationship between system pressure and both leakage flow rates and burst rates in a DMA. Thus, if the output pressure can be lower than the fixed pressure whilst still providing adequate pressure at the Critical Point, there will a reduced risk of leakage and burst occurrences.

It has been proposed that the output of the PRV should be variable so that the pressure can be varied depending on demand, thus reducing the average pressure within the DMA and reducing problems with leakages and bursts. Other advantages of controlling the pressure actively include reduced fatigue on the pipe network, the provision of more constant supply pressure to consumers, and a reduction in pressure related consumption.

One system in which a PRV is controlled by a pilot valve is disclosed in GB 2405957. There is a pressure feedback stage including a gate valve that creates a head loss which increases with flow through the PRV. The head loss causes water to flow in a bypass pipe that incorporates a venturi. The pilot valve is controlled by pressure at the venturi. This pressure decreases as flow rate increases, thereby causing the pilot valve to increase the output pressure of the PRV as flow rate increases.

It has also been proposed that a pilot valve should be controlled electrically, using a controller. EP-0574241 discloses a system which varies the PRV output pressure in accordance with a pressure-time profile generated from historical data. This pressure-time modulation system is based on an assumption that demand is cyclically predictable over time. EP-0574241 also refers to an alternative arrangement, in which, instead of the output pressure being controlled as a function of time, it is controlled as a function of flow rate.

In WO 2008/090359 there is disclosed a controller for adjusting the output pressure of a pressure reducing valve supplying water to a consumer region, in which the controller includes a clock and a processor is configured to use time data, stored parameters and flow rate, so that the pressure reducing valve is adjusted to provide the required output pressure corresponding to both the flow rate and the time.

In a preferred implementation of the system in WO 2008/090359 a remote data processing facility receives logged data from the controller and critical point pressure data from a pressure sensor adjacent the critical point. The remote data facility calculates parameters to be transmitted to the controller using the logged data received from the controller and the critical point pressure data. Preferably, the parameters transmitted to the controller cover a period of time which is greater than the intervals between the controller and the remote data processing facility being in data communication.

WO 2008/090359 thus discloses systems for controlling the water pressure within a DMA so that a required pressure is maintained at the critical pressure, whilst the output pressure from the PRV is not kept at an unnecessarily high level. Of course, it is necessary to ensure that the input pressure to the PRV from the main arterial supply is at a sufficient level to provide the output pressure required from the PRV. The water pressure from a main pumping station supplying the arterial network is therefore kept sufficiently high to ensure that, for each DMA supplied by the network, the input pressure is sufficiently high to satisfy the needs of that DMA.

One aspect of the present invention is concerned with controlling the output pressure of the pumping station so that, whilst meeting the pressure requirements of all of the DMAs or regional supply networks, it is not unnecessarily high.

Within a DMA or regional supply network there are other parameters of the water supply which can be controlled, apart from pressure, and there are other types of critical point. Consider, for example, the treatment of water to destroy bacteria by the addition of chlorine or other disinfecting agents to the water. There will be a minimum concentration of the disinfectant required for effective disinfection, as well as a critical point for disinfectant concentration where the concentration is lower than anywhere else in the DMA (which may not be the same critical point as that used for pressure). However, the use of disinfectant must be controlled carefully to ensure that, whilst there is adequate disinfection, excessive use of disinfectant is avoided. Excessive use of disinfectant will result in complaints from consumers about taste, odour or skin irritation; possible health risks; and causes unnecessary expense in the purchase of chemicals.

Treatment of water by the addition of disinfectant is traditionally carried out before water is fed into the main arterial network. Thus, another aspect of the invention concerns controlling the centralised addition of disinfectant or other water treating agents to ensure that, whilst meeting the agent concentration requirements of the DMAs which are supplied, the concentration is not unnecessarily or undesirably high.

It will be appreciated that, for disinfection monitoring purposes at a critical point within a DMA, it would be possible to monitor the concentration of disinfectant and/or the concentration of bacteria at the critical point.

In its broadest aspect, the invention encompasses controlling water pressure or the addition of agents to the water at a centralised supply station for a number of DMAs. Thus, viewed from this aspect, the invention provides a method of processing water that is supplied from a mains water supply station to a main supply conduit, the main supply conduit feeding the water to a plurality of regional supply networks or district metering areas, wherein:

for each regional supply network or DMA, there is a regional boundary value for a parameter related to a property of the water within that regional supply network or DMA which represents a boundary between acceptable and unacceptable values of the parameter within the regional supply network or DMA; and for each regional supply network or DMA, there is designated a critical point within the regional supply network or DMA at which the value of the parameter is deemed to be the least acceptable compared with the values at other points in the same regional supply network or DMA;

and wherein the method comprises:

monitoring water supply characteristics in respect of each regional supply network or DMA to provide monitoring data;

using the monitoring data to establish control data such that processing of the water that is supplied into the main supply conduit from the main water supply station is controlled so as to ensure that there can be maintained at the critical point within each regional supply network or DMA a respective acceptable value of the parameter; and processing the water which is supplied into the main supply conduit in accordance with the control data.

Each of the regional supply networks or DMAs may be connected to the main supply conduit by means of a respective pressure reducing valve which supplies the water to the regional supply network or DMA at a respective regional pressure.

These PRVs may be arranged to provide a constant pressure reduction or a variable pressure reduction, or may be a mixture of both types. In some embodiments, some or all of the regional supply networks or DMAs may be connected to the main supply conduit by respective booster pumps which supply the water at a respective regional pressure. Some or all of the regional supply networks or DMAs may be connected directly to the main supply conduit, without any PRV or booster pump, but simply by a meter.

In some arrangements, the parameter is the water pressure, the critical point in each regional supply network or DMA is a pressure critical point, processing water which is supplied into the main supply conduit comprises controlling the pressure of the water supplied into the main supply conduit, and the control data govern the pressure of the water.

Thus, assume for example that there are three regional supply networks each having a respective pressure reducing valve or booster pump. For each network, the required output pressure P2 of the respective pressure reducing valve or booster pump in order to provided the required water pressure at the critical pressure is calculated. Given the characteristics of a particular pressure reducing valve (e.g. the minimum head loss across the valve), the minimum input pressure from the main supply conduit P1 can be calculated to realise a PRV output pressure of at least P2. Each of the regional supply networks may require a different minimum input pressure value, and the required minimum input pressure for any given network may vary as a function of flow rate into that network and/or time and/or other factors. This function may be learnt for some or all of the regional supply networks or DMAs using the monitoring data during an training phase and/or on a continuing basis. The mains pressure provided by the mains water supply station can then be controlled to maintain at least these minimum values. By determining the mains supply pressure actually required to ensure that each of the regional supply networks can meet its requirement to maintain a minimum pressure at its critical point, greater control can be exerted. Instead of the mains pressure being maintained at an unnecessarily high value, it can be maintained at a value just sufficient to meet consumers' needs. This means that water pumping requirements can be controlled to a minimum; for example, by switching pumps on or off, or controlling their individual outputs. As well as saving energy and the associated costs thereof, the lifetime of the pumps and the pipes carrying water away from the mains water supply station may be increased by avoiding generating unnecessarily high pressures. Furthermore, both the incidence and the severity of leaks in the water distribution pipes may be reduced.

In such arrangements, the monitoring data will be related to the required output pressure of a PRV to ensure that the minimum acceptable pressure is maintained at the critical point within the regional supply network concerned. From this and the characteristics of the PRV the minimum input pressure can be calculated.

From monitoring the regional supply networks over a suitable period, it may be determined that there is one regional supply network where the inlet pressure of the PRV at all times has to be higher than that for any other PRV. Alternatively, it may be determined that there is one regional supply network where the inlet pressure of the PRV typically has to be higher than that for any other PRV for a particular time period (e.g. a given hour of the day, day of the week, month, season, etc.) and/or flow rate into the regional supply network and/or other usage characteristic (e.g. during half-time on televised sports matches) and/or other relevant factor (e.g. temperature). In either case, such a pressure reducing valve could be designated as a permanent or temporary critical pressure reducing valve and the water pressure at the pumping station controlled so that the pressure of the water supplied to that PRV is acceptable (taking due account, where appropriate, of the pressure difference in the main supply conduit between the pumping station and the PRV). It may therefore no longer be necessary to monitor the other regional supply networks after the suitable period.

Preferably, however, monitoring of all regional supply networks is maintained so as to guarantee that each PRV is supplied with a sufficient pressure of water.

In other arrangements, the parameter is the concentration of a water treatment agent (or the concentration of impurities in the water if the effect of the treating agent is to remove such impurities), the critical point in each regional supply network is a treatment-agent critical point, the processing of the water comprises controlling the addition of a treatment agent to the water supplied into the main supply conduit, and the control data govern the addition of the treatment agent. This may be done at the pumping station itself or elsewhere, for example at a treatment plant which supplies treated water to the pumping station. The water treatment agent is not limited to any particular agent and may, for example, comprise: a dye; a flavour enhancer; or a health additive, such as fluoride. In preferred embodiments, however, the treatment agent comprises a disinfectant agent, such as bromine, iodine, copper ions, silver ions, hydrogen peroxide, or, especially, chlorine.

The two type of monitoring and process control may both be used, and in general any number of different characteristics of the water and its supply may be controlled.

In general, although the regional boundary values may differ from one another, in preferred embodiments they will be the same as each other (since, for example, the same minimum chlorine concentration, or minimum water pressure, may be required across an entire water region or even across an entire country).

The monitoring of water supply characteristics in respect of each regional supply network may comprise continuous monitoring, with the monitoring data being real-time data, but it preferably comprises intermittent monitoring, at intervals that may be regular or irregular. The monitoring data may comprise a continuously-sampled value of the parameter at each critical point; but they preferably comprise an intermittently-sampled value of the parameter at each critical point. The monitoring data may also comprise continuously- or intermittently-sampled flow rate data relating to a regional supply network or DMA. By obtaining data intermittently it is not necessary for monitoring equipment to be in continuous or real-time communication with a controller or central server (remote data processing facility), which may be difficult or impossible to achieve (since, for example, a permanent power supply and/or wired communication link are not necessarily available at the critical point). Rather, in preferred embodiments, at each critical point there is located a monitoring device that is self-powered (e.g. by battery, solar cell or fuel cell) and arranged for wireless communication (e.g. GSM, GPRS or 3G) with a controller or central server.

Preferred embodiments comprise the further step of processing water which is supplied into the main supply conduit in dependence on the flow rate of water from the main supply station into the main supply conduit. Thus there may be further steps of determining data representative of the flow rate of water from the main supply station into the main supply conduit, and further using the flow rate data to establish the control data. Water at the main supply station may additionally or alternatively be processed in dependence on any one or more of: time; hour of the day; day of the week; month of the year; season; current or recent ambient air temperature; current or recent water temperature; current or recent rainfall; or any other relevant factor.

Yet further arrangements may be envisaged; for example, where the parameter is the concentration of microbes in the water, the critical point in each regional supply network is a microbe critical point, processing water which is supplied into the main supply conduit comprises controlling the addition of the treatment agent to the water supplied into the main supply conduit or of controlling the application of an antimicrobial treatment such as treatment with UV light, ozone, gamma rays, sound or heat to the water.

The various possible arrangements described above can be combined, either using the same critical point in each regional supply network for multiple purposes, or using different critical points. At least one regional supply network could use the same critical point for multiple purposes. At least one regional supply could use different critical points for different purposes. In general within a regional supply network any number of parameters could be controlled for, using shared critical points, different critical points, some critical points shared and others separate, and so forth. Any number of water processing features could be applied and, in appropriate cases, a particular processing feature could be applied in accordance with a plurality of different controlled parameters in a regional supply network.

In some preferred embodiments both chlorine treatment (or any other antimicrobial treatment) and water pressure are controlled at the main water supply station, having regard to the values in each regional supply network of both pressure at a pressure critical point and chlorine concentration at a chlorine critical point. While the chlorine critical point might be the same point as the pressure critical point in any given regional supply network (e.g. a point that is the highest within the regional supply network and/or the most distant from the PRV), in general they are likely to be at different points. The pressure critical point may, for example, be close to the highest outlet in the regional supply network, since pressure is dependent on height (although other energy loses such as frictional loses in the pipe may also play a significant part in determining the choice of a pressure critical point), but it is often at the most distant point from the PRV, or may swap between the two points depending upon flow rates. Chlorine concentrations typically deplete with time and exposure to temperature, and thus the chlorine critical point is likely to be a point in the network that typically contains the "oldest" water—i.e. water which has been in the regional supply network the longest; this may mean that the chlorine critical point is far removed from the PRV, or its position may be determined by a particularly low rate of consumption from a certain part of the network.

From moment to moment, in any given regional supply network, the precise point having the least acceptable value for the parameter compared with the values at other points in the same regional supply network may shift location by relatively small amounts (when, for example, a customer opens a tap in a property); its location may therefore, for practical purposes, be indeterminate beyond a certain degree of precision. Thus the designation of a critical point in the present invention is to be understood as a designation of a point deemed to exhibit or approximate such least acceptable characteristics on average over a period of time. Of course, the need to find suitable locations to install monitoring equipment, as well as other practical considerations, may mean that the designation can at best only be an estimate of the instantaneous actual point of least acceptable value of the parameter. However, the need in some situations to approximate does not detract from the usefulness of the present invention.

Furthermore, the actual point having the least acceptable value for the parameter compared with the values at other points in the same regional supply network may also shift location by relatively large amounts from time to time. Thus, in some embodiments, for one or more regional supply networks there may be designated a plurality of potential critical points within that regional supply network at each of which the value of the parameter is deemed from time to time to be the least acceptable compared with the values at other points in the same regional supply network. Preferably, at any one time, precisely one of the potential critical points is designated as the critical point for that regional supply network, and is thus the critical point in respect of which the aforesaid control data are established. However, in certain embodiments, more than one critical point of the same type (e.g. two pressure critical points) may, temporarily or permanently, be designated simultaneously for a given regional supply network; when, for example, the parameter values at both points are nearly identical to one another (e.g. sufficiently close that measuring equipment in use cannot resolve the difference between them). In such circumstances, control data may be established such that processing of the water that is supplied into the main supply conduit from the main water supply station is controlled so as to ensure that there can be maintained at a plurality of critical points within one regional supply network a respective acceptable value of the parameter.

It will be appreciated that, in some cases, one or more regional supply networks supplied by the main water supply station may not be provided with suitable monitoring arrangements, for example when the system is first being introduced. In that event, manual measurements may have to be taken in order to ensure that, for example, water pressure and chlorine concentration are acceptable in such regional supply networks. Preferably, however, monitoring means are permanently located at each critical point.

In some embodiments, there may be monitoring means situated at each critical point that are arranged to provide continuous or frequent monitoring of the value of the parameter at the respective critical point. However, for reasons given above, such continuous or frequent monitoring may not be possible or desirable. When only intermittent monitoring data are available—for example, consisting of an hourly update of the value of the parameter at each critical point—there is a risk that the value of the parameter moves to an unacceptable level in the periods for which no monitoring data are available. However, factors such as the flow rate of water entering the main supply conduit, the time of day, week, month or year, the ambient air temperature and/or the temperature of water entering the main supply conduit may have a relationship with the value of the parameter at each critical point. Processing of the water which is supplied into the main supply conduit may preferably also be in according with data relating to such factors and said relationships. In this way, the risk that the value of the parameter moves to an unacceptable level in the periods for which no monitoring data are available may be mitigated.

Monitoring means may be provided at the entrance to a regional supply network or DMA, and may be configured to transmit monitoring data relating to the flow rate and/or pressure of water entering the region or area.

From another aspect the invention provides a controller for processing water that is supplied from a mains water supply station to a main supply conduit, the main supply conduit feeding the water to a plurality of regional supply networks, each of which is connected to the main supply conduit by means of a respective pressure reducing valve which supplies the water to the regional supply network at a respective regional pressure, wherein:

for each regional supply network there is a regional boundary value for a parameter related to a property of the water within that regional supply network which represents a boundary between acceptable and unacceptable values of the parameter within the regional supply network; and for each regional supply network, there is designated a critical point within the regional supply network at which the value of the parameter is deemed to be the least acceptable compared with the values at other points in the same regional supply network;

and wherein the controller comprises:

a flow rate input for receiving a flow rate signal from a flow rate sensor for water flowing into the main supply conduit, and means adapted to provide data representative of the flow rate of water flowing into the main supply conduit in accordance with the flow rate signal;

a control output for providing a control signal to adjust the processing of water which is supplied into the main supply conduit;

data storage means storing parameters representing a relationship between the flow rate of water and a required processing of water which is supplied into the main supply conduit in order to maintain at the critical point within each regional supply network a respective acceptable value of the parameter; and processing means configured to process (i) the data representative of the flow rate and (ii) the stored parameters, so that a control signal is provided from the control output in order to adjust the processing of water which is supplied into the main supply conduit corresponding to the flow rate.

As previously, the parameter may be water pressure, or concentration of a water treatment agent, or any other suitable parameter.

Preferably the stored parameters represent a time-dependent relationship between the flow rate of water and the required processing of water that is supplied into the main supply conduit; preferably the controller then further comprises a clock providing data representative of time; and the processing means is configured to access the data representative of time, in addition to the stored parameters and the data representative of the flow rate, so that the signal which is provided from the control output causes the processing of water which is supplied into the main supply conduit to be adjusted corresponding to the flow rate and the time.

The time dependency of the relationship between flow rate and the required processing of water which is supplied into the main supply conduit can be such as to define the processing for a given flow rate at a particular time of day, and/or day in the week, and/or time of year. There could be a calendar representing a number of days, and within each day a number of periods. The number of days could correspond to a week, or a number of weeks, or a month, or a number of months, or a year. Within each day, the periods may for example be individual hours, or multiples of hours. In one embodiment, by way of example only, there is a calendar covering every day of the year, and for each day there are eight 3 hour periods, giving a total of 2920 periods in a standard calendar year and 2928 in a leap year. For each period there will be one or more parameters which will define the relationship between the measured flow rate and the required processing of water which is supplied into the main supply conduit. This could be done by having separate values stored for each period or, for example, by having default values which are used unless there is an entry for a particular period when the relationship needs to vary from the default relationship.

The rate of change of concentration of certain water treatment agents such as chlorine can be affected by the temperature of the water. It may therefore be advantageous to consider water temperature in parts or all of the supply network when determining the dosing of treatment agent at the main supply station. Thus, especially in embodiments in which the parameter is concentration of a water treatment agent (but also in some other embodiments), it is preferred that: the controller comprises a water temperature input for receiving a water temperature signal from a temperature sensor and means adapted to provide data representative of the water temperature in accordance with the water temperature signal; the data storage means stores parameters representing a relationship between the temperature of water and a required processing of water which is supplied into the main supply conduit in order to maintain at the critical point within each regional supply network a respective acceptable value of the parameter; and the processing means is configured to process (i) the data representative of the water temperature and (ii) the stored parameters, so that a control signal is provided from the control output in order to adjust the processing of water which is supplied into the main supply conduit corresponding to the water temperature.

More than one temperature sensor may be provided, each providing a water temperature signal for water at a different point in the supply network. Some or all of these signals may be averaged across the whole supply network (i.e. across all the regional supply networks), or averaged for a regional supply network, or they may be processed separately or in combination in any suitable way so that a control signal is provided from the control output in order to adjust the processing of water which is supplied into the main supply conduit corresponding to the water temperature at a plurality of points in the supply network.

In particular, a temperature sensor may be arranged to provide a temperature signal for water entering the main supply conduit. Preferably at least one temperature sensor is arranged to provide a temperature signal for water entering at least one, preferably all, of the regional supply networks. These latter temperature sensors may be conveniently situated adjacent the PRVs of each region. In some embodiments, a temperature sensor is situated adjacent the critical point of one or more regional supply networks. In particularly preferred embodiments, temperature sensors are located adjacent the PRV and adjacent the critical point (e.g. pressure and/or water treatment agent critical points) of each regional supply network and the controller is arranged to receive a water temperature signal from each temperature sensor. Temperature sensors may be located at or near any one or more of: an or the entry point of water into the main supply conduit; one or more regional supply network PRVs; one or more water treatment agent critical points; one or more pressure critical points; one or more regional supply network average zone points (AZP).

The controller may be situated at a distance from the water supply network; for example, at a remote data processing facility, or may be located at the main supply station from where water is supplied into the main supply conduit.

The flow rate signal and/or water temperature signal and/or any other relevant signals may be communicated wirelessly or over a wired connection from the respective sensor directly to the controller. Alternatively, it or they may be communicated by wireless or wired means to a data processing facility (e.g. central server), which may be remote from both the sensor and the controller, for storage or processing and onward transmission, again by wire or wirelessly, to the respective input of the controller. The sensor(s) may comprise logging means arranged to log collected data before intermittently transmitting them to the controller or a remote data processing facility.

At any particular time, the stored parameters may cover for example an entire year or a shorter time, the arrangement being that as time moves on additional parameters are stored and, optionally, previously used parameters removed. In the preferred arrangement, the parameters are maintained unless replaced by updated values.

When the controller is first commissioned it could be programmed with a basic set of parameters based on experience in previous installations and/or by taking measurements during a trial period. Those parameters can be varied and additional parameters added for further periods of time, by analysing data from use of the controller in practice. This will require a critical point parameter sensor at each critical point. The output from these critical point parameter sensors will be processed together with corresponding data relating to the flow rate. For synchronisation purposes all data will be time stamped (which includes time/date stamping, using times codes and so forth). The data from the critical point parameter sensor could be logged at the critical point and then collected or transmitted for analysis.

The calculation of the parameters could be carried out within the controller using suitable software and/or firmware routines, in which case critical point data would be transmitted to the controller from the critical point or relayed from a central location. However, in some preferred arrangements, the calculation of the parameters is carried out at a remote data processing facility and then the parameters will be transmitted to the controller. This arrangement provides advantages because the processing can be done continuously without draining the battery of the controller where it is battery powered, greater processing power can be employed, and data from other sources can be taken into account readily. For example, the parameters could depend on experience gained from other regions with similar systems whose data can be processed at the central data processing facility. Actual or predicted environmental factors can be taking into account, such as weather forecasts, temperature, rainfall, whether or not there is a hose pipe or sprinkler ban, upcoming sports events or other occasions, television listings, and so forth. In some embodiments, the controller resides at a remote data processing facility and the control signal is communicated to an adjuster located at the mains water supply station and arranged to adjust the processing of water which is supplied into the main supply conduit in response to the control signal.

In general, as regards features of the controller, in preferred embodiments the stored parameters are representative of a relationship between the flow rate of water into the main supply conduit and the required processing of the water which is supplied into the main supply conduit, which varies as a function of the time of day and/or the day of the week and/or the time of the year. The relationship may also advantageously be between the temperature of water and the said required processing of the water; this is particularly advantageous when the parameter is concentration of a water treatment agent such as chlorine which is affected by water temperature. Preferably the stored parameters are in respect of discrete intervals covering an entire day, for each of a number of successive days.

Preferably the controller comprises a communications module and is configured to use the communications module at intervals to establish communication with a remote data processing facility and to receive parameters which are stored in the data processing means. Preferably, the communications module is adapted for wireless communication.

In accordance with another aspect of the invention, there is provided a system for processing water that is supplied from a mains water supply station to a main supply conduit comprising a controller having any or all of the features described above and arranged to implement a method of the invention as described herein.

The system may comprise a remote data processing facility arranged to carry out steps described above. In particular, the remote data processing facility may generate the aforesaid parameters representing a relationship between the flow rate of water and a required processing of water, and communicate these to the controller.

The monitoring of water supply characteristics in respect of each regional supply network preferably comprises monitoring characteristics, such as the value of the parameter, at the critical point in each regional supply network, but it may also comprise monitoring characteristics elsewhere, such as at or adjacent the pressure reducing valve of one or more of the regional supply networks. In addition to relating to the value of the parameter, the monitoring data may also relate to other factors such as the water temperature, pressure, pH, microbe levels, etc.

In embodiments in which the pressure of water supplied into a main supply conduit is controlled, the processing of the water may comprise controlling the output of one or more pumps arranged to pressurise the water supplied into the main supply conduit. This control may be expressed as a percentage of the maximum power consumption of the pump or pumps.

In embodiments in which the concentration of a water treatment agent in water supplied into a main supply conduit is controlled, the processing of the water may comprise controlling the rate of addition of the water treatment agent to the water.

In some embodiments, monitoring means or a sensor situated at a critical point or at the entrance to a DMA may be configured to detect a change in a characteristic of the network or DMA, such as a change in water flow, and to send a wireless signal to a controller instructing the controller to alter its behaviour in response to the change.

The change may be a significant change in pressure and/or flow rate in the network, which could be due to, for example, a pipe bursting or a fire hydrant being opened. The signal may be sent using a mobile telephone protocol such as GSM, GPRS or 3G; e.g. an SMS message. The signal may be sent directly to the controller or relayed via a remote server; i.e. the sensor may send a first signal to a server and the server may, in response, send a second signal to the controller.

The controller that receives the signal is preferably located at or near the mains water supply station. The controller or server may be configured to cause the control data or parameters to be updated or overridden in response to the signal, thereby changing how the water that is supplied into the main supply conduit is processed.

Such an arrangement can be advantageous in comparison to systems in which such a wireless signal is sent to a controller located at the entrance of a DMA because the controller at the mains water supply station will typically have a permanent power supply (e.g. mains electricity) and therefore be able to receive and respond to a wireless signal more quickly than a battery-powered controller located by the PRV of a regional supply network. Where the controller controls a pumping station, for example, it will be able to communicate with the monitoring means, sensor or a server on a much more regular basis and can therefore respond rapidly to a sudden drop or rise in pressure.

By detecting a change, such as an abrupt increase in flow rate, at the DMA level, it may be possible to detect an event such as the opening of a fire hydrant which would not easily be detectable simply by monitoring the flow rate into the whole network from the mains processing station.

Monitoring means or a sensor at a critical point, or elsewhere in the network, may be configured to transmit a wireless alarm signal (e.g. an SMS message) when the value of the parameter at a point in the network (e.g. a regional critical point) drops below a minimum acceptable value. The monitoring means or sensor may also transmit an updated log file to the server which, when combined with the regularly updated log files being sent by a controller at the mains water supply station, enable a more intelligent response by the server.

From another aspect, the present invention provides a method of controlling the pressure of water supplied into a main supply conduit from a main water supply station, the main supply conduit feeding the water to a plurality of regional supply networks, each of which is connected to the main supply conduit by means of a respective pressure reducing valve which supplies the water to the regional supply network at a respective regional pressure, wherein:
  for each regional supply network, there is a regional boundary value for the water pressure which represents a boundary between acceptable and unacceptable water pressures within the regional supply network; and
  for each regional supply network, there is designated a pressure critical point within the regional supply network at which the water pressure is deemed to be the least acceptable compared with the water pressures at other points in the same regional supply network;
and wherein the method comprises:
  monitoring water supply characteristics in respect of each regional supply network to provide monitoring data;
  using the monitoring data to establish control data such that the pressure of water that is supplied into the main supply conduit from the main water supply station is controlled so as to ensure that there can be maintained at the pressure critical point within each regional supply network a respective acceptable water pressure; and
  controlling the pressure of water supplied into the main supply conduit as so determined.

From a further aspect, the present invention provides a method of controlling the addition of a water treatment agent to water supplied into a main supply conduit from a main water supply station, the main supply conduit feeding the water to a plurality of regional supply networks, each of which is connected to the main supply conduit by means of a respective pressure reducing valve which supplies the water to the regional supply network at a respective regional pressure, wherein:
  for each regional supply network, there is a regional boundary value for the concentration of the water treatment agent which represents a boundary between acceptable and unacceptable concentrations of the water treatment agent within the regional supply network; and
  for each regional supply network, there is designated a treatment-agent critical point within the regional supply network at which the concentration of the water treatment agent is the least acceptable compared with the concentrations at other points in the same regional supply network;

and wherein the method comprises:
  monitoring water supply characteristics in respect of each regional supply network to provide monitoring data;
  using the monitoring data to establish control data such that the addition of water treatment agent to water that is supplied into the main supply conduit from the main water supply station is controlled so as to ensure that there can be maintained at the treatment-agent critical point within each regional supply network a respective acceptable concentration of water treatment agent; and
  controlling the addition of water treatment agent to water supplied into the main supply conduit as so determined.

Optional or preferred features of any aspect of the present invention are not to be understood as being limited necessarily to that aspect only, but as being applicable to the other aspects of the invention as appropriate.

A preferred embodiments of the invention will now be described, by way of example only, with reference to the accompanying drawing, in which FIG. 1 is a schematic diagram of water supply system arranged to carry out a process in accordance with the present invention.

FIG. 1 schematically shows a water supply system fed from a reservoir 2. Water from the reservoir passes along a pipeline 4 to a main supply station 6. The main supply station 6 comprises a chlorine treatment unit 8 and two pumps 10 each connected to a main supply conduit 12. The main supply conduit 12 feeds three regional supply networks 14, 16, 18 via respective pressure reducing valves (PRV) 20, 22, 24.

Within the first regional supply network 14, there is designated a pressure critical point 26 and a chlorine critical point 28. These points are close to one another and are, for example, near the top of the highest hill in the geographic region served by the regional supply network 14. Also shown is an Average Zone Point (AZP) 35 for the region, which is a point at which the water pressure is typically near the average pressure across the whole regional supply network. The second regional supply network 16 also has designated a pressure critical point 30 and a chlorine critical point 32, but these are further apart than the corresponding points of the first regional supply network 14. This may be because the highest point in the region is close to the PRV 22 and is the pressure critical point 30, while the chlorine critical point 32 is at the farthest point in the region away from the PRV 22, but this point is not particularly high up. In the third regional supply network 18, the pressure critical point and the chlorine critical point are at the very same point 34, which may be at the highest point in the supply network.

Also located in the main supply station 6 is a flow rate sensor 7 for measuring the flow rate M into the main supply conduit 12 and a control unit 36. The measured flow rate M is transmitted from the control unit 36 over a communications network (which may be wireless but is preferably wired) to a remote central control station 38 where there is a data processing facility. In wireless communication with the central control station 38 are critical point sensor units 40, 42, 44, 46, 48, located one at each critical point 26, 28, 30, 32, 34. These critical point sensor units comprise a pressure sensor and/or chlorine concentration sensor (which may measure the residual free chlorine or the total chlorine); a water temperature sensor; a data logger and a communications unit. Sensor readings are time-stamped and stored on the data logger. Information stored on the data logger might be retrieved manually by an engineer, who will connect to the logger by any suitable wired or short- or long-range wireless means. However, preferably the communications unit, at intervals, transmits data from the logger by SMS or other suitable wireless means to the central control station 38, which processes the pressure/chlorine concentration data, together with the flow rate M data received from the control unit 36, in order then to transmit suitable control parameters to the control unit 36 so that the pumps 10 and the chlorine treatment unit 8 can be controlled to provide the required pressure/chlorine concentrations at the critical points.

Other information may also be factored into the processing of the control parameters, such as the time information contained in the time-stamps of the sensor readings, water temperature recorded at the critical point sensor units 40, 42, 44, 46, 48, rainfall sensors, characteristics of the PRVs 20, 22, 24, head losses in the main supply conduit between the pumps 10 and the PRVs 20, 22, 24, etc. In order to obtain a detailed picture of water temperatures across the whole distribution network, there may be additional water temperature sensors located adjacent one or more of the PRVs 20, 22, 24 and at other appropriate points in the distribution network, such as at one or more of the Average Zone Points (AZPs) of the regional supply networks, and in the main supply conduit.

The control parameters transmitted to the control unit 36 might be direct control commands such as "increase the pumps to 80% power"; or "decrease the chlorine concentration to 0.2 mg/L" (or 0.2 ppm), requiring almost immediate action. This may be appropriate where the critical point sensor units 40-48 are able to transmit frequent updates of the value of the parameter(s) they are monitoring. However, the standard mode of operation in the present embodiment is for the control unit 36 to control the pumps 10 and chlorine treatment unit 8 based on the measured flow rate M and the time T output by a clock (not shown), as well as any other relevant environmental sensor inputs (e.g. air temperature, water temperature, recent rainfall), in accordance with parameters stored in the control unit 36, which have been retrieved from the central control station 38.

A preferred arrangement for the control unit 36 to use these stored parameters is via a lookup table having axes for flow rate bands, time bands, and possibly other bands such as average regional supply network water temperature, and having numerical entries giving appropriate pump control levels (relating, for example, to the power consumption of the pumps) and chlorine concentration levels. The lookup tables might be three- or multi-dimensional, including axes for light intensity, a rain sensor, water temperature, air temperature, or other local environmental inputs. An alternative to using one or more lookup tables is for a processor in the control unit 36 to evaluate a function which involves measured values and constants which are stored parameters. In either case, the control unit 36 sends appropriate control commands to the pumps 10 and the chlorine treatment unit 8.

The speed of response to changes in flow rate M may be controlled by a damping variable to limit the speed of change in pressure and/or chlorine concentrations into the main supply conduit 12.

The stored parameters are generated and loaded into the control unit 36 as follows.

Especially in an initial setup phase, an engineer could manually determine the parameters based on the size of the regional supply networks, historical flow rates, distances and height differences to the critical points, and load these onto the control unit 36. Simple rules could be used to estimate the relationship variables. The engineer could use suitable software to assist in determining the parameters.

In normal usage, and optionally even at initial installation, the parameters, or incremental updates thereto, are transmitted from the central server 38. This communication may be intermittent; for example initiated by the control unit 36 over a wireless link. Preferably, however, there is a permanent wired communications link between the controller (36) and the server (38) allowing real-time communication between the two.

The parameters preferably take the form of one or more discrete lookup tables, as already described. They may, however, describe or parameterise a continuous curve or multi-dimensional surface, or parameterise some other relationship model, such as a neural network.

Although in some embodiments, the control unit 36 itself may generate appropriate parameters from raw data, in the present embodiment, the primary analysis of data is conducted on the central server 38. This may allow for efficiencies of scale if the central server 38 is arranged to control several main supply stations. Typically initial training data will be gathered over a one or two week time period, but this period may be longer to capture seasonal effects, or several distinct sets of training data may be gathered. The measurements of the flow rate M are transmitted at intervals to the central facility 38. The pressure and chlorine concentrations at the respective critical points 26-34 are logged on the critical point sensor units 40-48.

The critical point sensor units are synchronised with the control unit 36, directly or indirectly—by both being synchronised with a clock at the central facility 38—before the data gathering period to ensure both units have synchronised clocks. After the data gathering period, the critical point sensor units 40-48 send pressure/chlorine concentration data by SMS or other means to the central server 38. The central server 38 analyses the relationship of pressure and chlorine concentrations to differing flow rates M and times T, optionally also taking into account other factors that may be relevant, such as weather conditions, sports fixtures, factory usage information, etc. and derives parameter values using regression or any other suitable statistical algorithm to establish a best fit curve, best fit multi-dimensional surface plot or other appropriate relationship model, which may be discrete or continuous. A supervised learning approach may be used; for example, a neural network, Bayesian classifier, etc. In this way, the relative importance of input factors such as sports fixtures, weather, season, etc. need not be assumed in advance, but can rather be learned and weighted appropriately by the software on the central server 38.

If the software is unable to determine an appropriate relationship, it will alert the operator who can interrogate the data and override with a manual curve or other relationship.

A modelled relationship on the central server 38 may be continuous or discrete over the input variables (flow rate, time, water temperature, air temperature, etc.). Although parameters fully describing a continuous, possibly multi-dimensional relationship could be loaded directly onto the control unit 36, in the present embodiment, a simplified lookup table is generated by the central server 38, in which flow, time, etc. are divided into appropriately-sized discrete intervals.

For example, the central server 38 may use measured parameters to determine a relationship, for each regional supply network 14, 16, 18, between (i) the power or output pressure of the pumps 10 required to maintain a minimum acceptable pressure at a respective pressure critical point 26, 30, 34 in the region and (ii) the flow rate M of water entering the main supply conduit.

This relationship may take the form of a linear or curved line or function. For a regional supply region n, the required minimum output pressure $P0\_min\_n$ for a given flow rate M may be as follows:

$$P0\_min\_n = CP\_min\_n + (CP\_n - P2\_n) + \min(P2\_n - P1\_n) + (P1\_n - P0\_n),$$

where:
- $CP\_min\_n$ is the minimum acceptable pressure at the critical point in the region;
- $(CP\_n - P2\_n)$ is the calculated head loss between the critical point and the output of a PRV supplying the region (which may vary with flow rate M);
- $\min(P2\_n - P2\_n)$ is the known or calculated minimum head loss across the PRV (i.e. when it is wide open) (which may vary with flow rate M); and
- $(P1\_n - P0\_n)$ is the calculated head loss in the main supply conduit between the output of the pumps 10 and the input to the PRV (which may vary with flow rate M).

The central server 38 may determine the maximum P0_min across all the regional supply networks against flow rate M. (The identity of the region requiring the maximum pump output pressure may change as the flow rate M changes.) This relationship may be used to generate the lookup table for controlling the pumps.

Of course, this approach may be extended to other variables, in addition to flow rate M, to generate a multi-dimensional lookup table.

However it is produced, the lookup table is loaded onto the control unit 36 and used as described above. The table may be loaded incrementally over time, and may be updated periodically as the central server 38 revises the simplified lookup table to take account of predicted weather patterns for the next 24 hours or week, or future sports fixtures, such as a golf tournament, for example.

The parameters supplied to the control unit 36 from the central facility 38 are such that if there is an interruption in communications for any time, before updated parameters can be loaded, there will be sufficient parameters to adjust the output pressure appropriately over expected periods such as days of the week, weekends and so forth.

The central server 38 may control several independent mains water supply areas, each with its own main supply station. Where there are appropriate similarities between the water supply areas, the central server 38 preferably uses the data obtained from one main supply area to improve the accuracy of the parameters determined for a different main supply areas. By way of example only, it may be determined from data logged in respect of a first main supply area that hours of sunshine has a more significant effect than month of the year in determining the optimal relationship between flow rate M, time T and the required chlorine concentration of water entering the main supply conduit 12; this knowledge could be used in the optimising of parameters for a second main supply area which may not be equipped with a light meter. In this way, optimal use is made of the available training data.

The control unit 36 in any particular main supply area may have the facility to temporarily override an existing relationship manually—i.e. to toggle between any existing automatically derived or manually set parameters to a new temporary set of parameters, with the ability to revert back to the original.

Sensor units (not shown) similar to the critical point sensor units may optionally be installed at the PRVs 20, 22, 24. These would measure input and output pressure at the respective PRV and may also measure flow rate through the PRV, as well as other variables such as water temperature and air temperature, which they would communicate to the central server 38 to be used as further inputs for determining the parameters to be supplied to the control unit 36.

In summary, the preferred embodiments of the invention provide a method, system and controller for a mains water supply station whereby acceptable values of one or more parameters may be maintained in a plurality of district metering areas supplied by the main supply station while avoiding unnecessary consumption of resources such as electricity or chemical additives.

What is claimed is:

1. A method of controlling one or more pumps arranged to pressurize water supplied from a mains water supply station to a main supply conduit, the main supply conduit feeding the water to a plurality of regional supply networks, each of which is connected to the main supply conduit by means of a respective pressure reducing valve which supplies the water to the regional supply network at a respective regional pressure, wherein:

for each regional supply network, there is a regional minimum required value for the water pressure within that regional supply network; and for each regional supply network, there is designated a pressure critical point within the regional supply network;

and wherein the method comprises:

intermittently monitoring water pressure in respect of each regional supply network, at intervals, to provide monitoring data that relate to the output pressure of the respective pressure reducing valve required to maintain a pressure at the pressure critical point within the respective regional supply network that is at least equal to the regional minimum required value, the monitoring data comprising intermittently-sampled values of the water pressure at each pressure critical point;

for each regional supply network, calculating from (i) the monitoring data in respect of the regional supply network, and (ii) the minimum head loss across the pressure reducing valve of the regional supply network, a minimum input pressure for the pressure reducing valve of the regional supply network required to maintain a pressure at the pressure critical point within the regional supply network that is at least equal to the regional minimum required value;

establishing control data based on (i) said calculated minimum input pressures for the pressure reducing valves, and (ii) information relating to a respective head loss between the mains water supply station and the input of the respective pressure reducing valve, for each of the regional supply networks, said control data governing the pressure of the water that is supplied into the main supply conduit from the main water supply station so as to ensure that a respective value of the water pressure can be maintained at the pressure critical point within each regional supply network that is at least equal to the respective minimum required value; and controlling the pressure of the water which is supplied into the main supply conduit in accordance with the control data by controlling the output of one or more pumps arranged to pressurize the water supplied into the main supply conduit.

2. The method of claim 1 wherein the minimum input pressure for each pressure reducing valve is calculated as a function of flow rate into the main supply conduit from the mains water supply station.

3. The method of claim 1 wherein one of the pressure reducing valves is permanently or temporarily designated as a critical pressure reducing valve, and the water supplied into the main supply conduit is controlled so that the pressure of the water supplied to the critical pressure reducing valve is sufficient to ensure that a value of the water pressure can be maintained at the pressure critical point within the regional supply network that is connected to the main supply conduit by the critical pressure reducing valve that is at least equal to the regional minimum required value.

4. The method of claim 1 wherein the regional minimum required values are all the same value.

5. The method of claim 1 further comprising determining data representative of the flow rate of water from the main supply station into the main supply conduit, and using the flow rate data to establish the control data, such that the controlling of the pressure of the water which is supplied into the main supply conduit is further dependent on the flow rate.

6. The method of claim 1 wherein the controlling of the pressure of the water which is supplied into the main supply conduit is dependent on a factor selected from the group consisting of: time; hour of the day; day of the week; month of the year; season; current ambient air temperature; recent ambient air temperature; current water temperature; recent water temperature; current rainfall; and recent rainfall.

7. The method of claim 1 wherein, for each regional supply network, there is designated a plurality of pressure critical points within the regional supply network, and the pressure of the water that is supplied into the main supply conduit from the main water supply station is controlled so as to ensure that there can be maintained at every pressure critical point within each regional supply network a respective value of the water pressure that is at least equal to the respective minimum required value.

* * * * *